Sept. 20, 1932.  W. MEITNER  1,878,507
PROCESS FOR THE RECOVERY OF TIN COMPOUNDS IN THE ART OF LOADING SILK
Filed Dec. 11, 1931
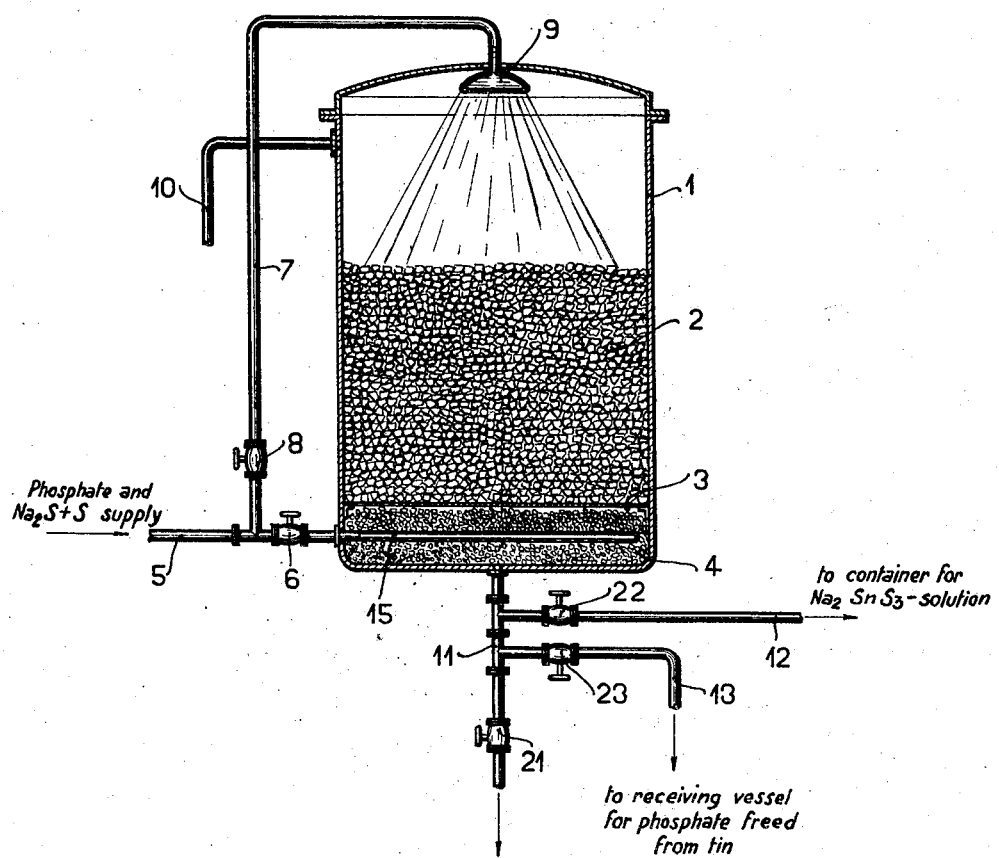

Patented Sept. 20, 1932

1,878,507

UNITED STATES PATENT OFFICE

WALTER MEITNER, OF VIENNA, AUSTRIA

PROCESS FOR THE RECOVERY OF TIN COMPOUNDS IN THE ART OF LOADING SILK

Application filed December 11, 1931, Serial No. 580,471, and in Austria December 9, 1930.

The invention relates to the recovery of tin compounds in the art of loading silk.

When silk is treated so as to become loaded by adding to the fibres stannic chloride, washing with water and subsequently treating with di-sodium-phosphate the excess stannic chloride is precipitated on the surface of the silk and passes into the remaining phosphate baths which thus contain 1 part per thousand of metallic tin. The recovery if any of this tin has hitherto been rather incomplete.

The invention relates to a simple process for separating out from phosphate baths the tin which they have taken up and which impairs their further application, such recovery being performed without losses of phosphate. All the methods of purification hitherto proposed are expensive and involve high losses of phosphate. The present process allows of a complete recovery of tin in an inexpensive manner because it works without application of fuels and chemicals. It simply consists in passing the liquid under treatment through a filtering device which has an absorbing action on tin compounds, whereas it allows to pass the other substances dissolved in the liquid without altering the same.

As a suitable filtering material I may use active aluminium hydroxide by itself or substances containing such aluminium hydroxide.

The use of aluminium hydroxide as an active filtering material is already known. Some time ago it has been proposed to use precipitated or washed alumina for decolorizing or deodorizing liquids. Moreover active alumina has been applied for drying gases and vapors and for dehydrating liquids. For this purpose aluminium hydroxide is suitable which has been pressed to solid pieces and has been heated to 400 to 600° C. Aluminium hydroxide which has been heated to higher temperatures has also been proposed as an adsorbing means for organic substances having a hydroxyl group such as alcohols, phenols and the like.

For the purification of phosphate baths and the simultaneous recovery of tin in an inexpensive manner activated aluminium hydroxide is used according to the invention which is preferably prepared by decomposing bauxite or precipitating a soluble aluminium compound and converting the thus obtained aluminium hydroxide by drying it at about 100° C. to a granular mass containing 50 to 70 per cent. water. From this mass a filtering device is built up which is similar to the filtering devices used in the purification of water and which is illustrated in the accompanying drawing.

If the phosphate baths are passed through such a filter without being heated the filter completely adsorbs the tin and merely retains some phosphoric acid in the beginning of the filtering process, which is, however, dissolved later on by further quantities of the liquid under filtration or by a subsequent washing with water.

For the recovery of tin and a simultaneous reactivation of the filtering device the latter is washed with a solution of sodium sulphide to which sulphur has been previously added. In this manner a solution of sodium sulpho-stannate is formed from which the tin may be precipitated by acidifying the solution.

The invention is illustrated by the following example:

250 liters of phosphate bath containing 0.4 g. Sn per liter are passed during 5 hours over 10 kgs. of activated aluminium hydroxide having a water content of 68 per cent. The filtrate is free from tin. The filter is then washed with the solution of 0.8 kgs. $Na_2S.9H_2O$ + 0.1 to 0.2 kgs. sulphur in 8 liters of water. The filtrate contains the whole amount of tin contained in the phosphate bath.

In the accompanying drawing 1 designates a container for the filtering material 2. Near the bottom of said container is arranged a sieve 3 covering a layer of gravel 4, in which an inlet pipe 5 perforated at 15 is embedded. This pipe is provided with a shut-off valve 6. Pipe 7 branching off from pipe 5 and controlled by a valve 8 allows to introduce the solution into the filter from the top by means of a spray 9. The container 1 is fitted with an overflow pipe 10. At the bottom of the container 1 an emptying pipe 11 with a valve 21 is provided, from which conduits 12 and 13 controlled by valves 22 and 23 lead to the container for the $Na_2SnS_3$ solutions and to the receiving vessel for the phosphate freed from tin respectively.

In operation the phosphate solution to be freed from tin is supplied through pipe 5 either by gravity or by means of a pump or by air pressure; valve 6 is closed, valve 8 being open; the solution rises through pipe 7 to spray 9, from where it is distributed over the surface of the filtering material 2. The solution passes through said filtering material where it deposes its Sn contents and leaves the container through sieve 3, gravel layer 4 and the pipe 13 to the receiving vessel, valve 23 being open, valves 22 and 21 being closed.

To reactivate the filtering mass and to recover the tin contained therein a solution of $Na_2S$+sulfur is introduced into the container 1 alternatively through spray 9 and/or through the perforated pipe 15, valves 8 and 6 being open or closed respectively. The tin forms with said solution $Na_2SnS_3$, this latter solution being allowed to flow through the open valve 22 into a container, where Sn is set free by acidification. During this operation valves 21 and 23 are closed.

What I claim is:—

1. A process for recovering tin from waste phosphate baths in the art of loading silk which comprises passing the said phosphate baths through a filtering device charged with active aluminium hydroxide removing the filtrate and washing the filtering device with a solution capable of dissolving the tin.

2. In a process for recovering tin from waste phosphate baths in the art of loading silk, the step which comprises passing the said phosphate baths through a filtering device charged with aluminium hydroxide having a water content of 50 to 70 per cent.

3. In a process for recovering tin from waste phosphate baths in the art of loading silk, the step which comprises passing the said phosphate baths through a filtering device charged with active aluminium hydroxide being in a granular state.

4. A process for recovering tin from waste phosphate baths in the art of loading silk which comprises passing the said phosphate baths through a filtering device charged with active aluminium hydroxide removing the filtrate and washing the filtering device with a solution containing sulfur and sodium sulfide.

In testimony whereof, I affix my signature.

WALTER MEITNER.